United States Patent
Wu

(10) Patent No.: US 9,723,920 B1
(45) Date of Patent: Aug. 8, 2017

(54) HEIGHT-ADJUSTABLE TABLE WITH CONCEALED WIRING DESIGN

(71) Applicant: Strength Master Fitness Tech. Co., Ltd., Puxin Township (TW)

(72) Inventor: Shu-Yao Wu, Puxin Township (TW)

(73) Assignee: Strength Master Fitness Tech Co., Ltd., Puxin Township (TW)

(*) Notice: Subject to any disclaimer, the term of this patent is extended or adjusted under 35 U.S.C. 154(b) by 0 days.

(21) Appl. No.: 15/399,893

(22) Filed: Jan. 6, 2017

(51) Int. Cl.
| | | |
|---|---|---|
| *A47B 21/02* | (2006.01) | |
| *A47B 9/20* | (2006.01) | |
| *A47B 9/04* | (2006.01) | |
| *F16L 3/01* | (2006.01) | |
| *A47B 21/06* | (2006.01) | |
| *H02P 1/00* | (2006.01) | |
| *H02K 3/50* | (2006.01) | |
| *H02K 7/06* | (2006.01) | |

(52) U.S. Cl.
CPC ............ *A47B 21/02* (2013.01); *A47B 9/04* (2013.01); *A47B 9/20* (2013.01); *A47B 21/06* (2013.01); *F16L 3/01* (2013.01); *H02K 3/50* (2013.01); *H02K 7/06* (2013.01); *H02P 1/00* (2013.01); *A47B 2021/066* (2013.01)

(58) Field of Classification Search
CPC .. A47B 21/02; A47B 9/00; A47B 9/04; A47B 9/20; A47B 2009/043; A47B 2009/046; A47B 2021/066
See application file for complete search history.

(56) References Cited

U.S. PATENT DOCUMENTS

| | | | | | |
|---|---|---|---|---|---|
| 5,337,678 | A | * | 8/1994 | Grout | A47B 9/04 108/147 |
| 5,339,750 | A | * | 8/1994 | Smies | A47B 9/04 108/147 |
| 6,352,037 | B1 | * | 3/2002 | Doyle | A47B 9/00 108/147 |
| 6,494,005 | B2 | * | 12/2002 | Zimmerman | B66F 3/10 108/147 |
| 6,595,144 | B1 | * | 7/2003 | Doyle | A47B 9/00 108/147 |
| 2010/0301186 | A1 | * | 12/2010 | Chuang | B66F 3/08 248/422 |
| 2011/0120243 | A1 | * | 5/2011 | Pettersson | A47B 9/04 74/89.28 |

(Continued)

*Primary Examiner* — Daniel Rohrhoff
(74) *Attorney, Agent, or Firm* — Wang Law Firm, Inc.

(57) ABSTRACT

A height-adjustable table with concealed wiring design is provided herein, which includes table surface, table leg, table foot, driving mechanism, and control device. The table leg is connected between the table surface and the table foot and includes a telescoping tube structure. The driving mechanism includes motor, first threaded rod, and connecting tube. The first threaded rod screwed to one end of the connecting tube and the connecting tube are disposed in the telescoping tube structure. The motor is configured to drive the first threaded rod to alter the length of the telescoping tube structure. The control device includes wiring and a control interface. The wiring is disposed in the telescoping tube structure and spirals around the connecting tube. The wiring transmits power to the driving mechanism and transmits a control signal from control interface to the motor to drive the driving mechanism.

10 Claims, 7 Drawing Sheets

(56) References Cited

U.S. PATENT DOCUMENTS

2013/0015300 A1\* 1/2013 Klinke .................... A47B 9/20
                                                      248/49
2016/0051042 A1\* 2/2016 Koch ....................... A47B 9/00
                                                      248/550
2016/0360879 A1\* 12/2016 Kelley ................... A47B 21/02

\* cited by examiner

HEIGHT-ADJUSTABLE TABLE WITH CONCEALED WIRING DESIGN

BACKGROUND OF THE INVENTION

1. Field of the Invention

The present disclosure is related to a height-adjustable table with concealed wiring design. More specifically, the present disclosure is related to a height-adjustable table having wiring thereof disposed in the table leg.

2. Description of the Related Art

Generally speaking, the control wirings and the power cables of electric height-adjustable tables commonly found in the market are disposed at the external of thereof. The exposed wirings and cables are unaesthetic, and they pose as a hazard to the user as well, since they might trip the user passing by.

In addition, the manufacturing process to dispose the wiring inside the table leg is considerably difficult, since there is a limited amount of space inside the table leg to accommodate the wiring. As the result, it might be quite challenging to dispose the wiring in the table leg.

The limited space might cause the wiring disposed in the table leg to be worn out prematurely due to the abrasion or tangling among the wirings. Hence, a solution is needed to dispose the wirings in the table leg.

SUMMARY OF THE INVENTION

To this end, the present disclosure provides a height-adjustable table with concealed wiring design, which may include a table surface, a table leg, a driving mechanism, and a control device. The table leg may be connected to the table surface and may include a telescoping tube structure. The driving mechanism may include a motor, a first threaded rod, and a connecting tube. The first threaded rod and the connecting tube may be disposed in the telescoping tube structure. The first threaded rod may be screwed to one end of the connecting tube. The motor may be configured to drive the first threaded rod to be screwed into or unscrewed from the connecting tube to alter a length of the telescoping tube structure. The control device may include at least one wiring and a control interface. The wiring may be disposed in the telescoping tube structure and spirals around the periphery of the connecting tube. The wiring may transmit power to the driving mechanism and transmit a control signal from the control interface to the motor to drive the driving mechanism.

In a preferred embodiment, the telescoping tube structure may further include a first tube, second tube, and a third tube.

In a preferred embodiment, the first tube may be accommodated in the second tube, and the second tube may be accommodated in the third tube.

In a preferred embodiment, the motor may further include a driving threaded rod, and the driving threaded rod may protrude from a side of the motor.

In a preferred embodiment, the driving mechanism may further include a driving gear connected to one end of the first threaded rod. The motor may be configured to drive the driving threaded rod to rotate, and the driving threaded rod may then drive the driving gear to rotate and actuate rotation of the first threaded rod.

In a preferred embodiment, the height-adjustable table with concealed wiring design may further include at least one table foot. The table leg may be connected between the table surface and the table foot. The driving mechanism may further include a second threaded rod, which may be disposed in the table leg and may have one end thereof fixed to the table foot and the other end thereof screwed to the other end of the connecting tube.

In a preferred embodiment, the height-adjustable table with concealed wiring design may further include a power socket or a charging dock. The power socket or the charging dock may be disposed on the table surface and may be electrically coupled to the wiring.

In a preferred embodiment, the communication device may be electrically coupled to exercise equipment by means of wired or wireless connection.

In a preferred embodiment, a signal transmission cable of the communication device may be disposed in the telescoping tube structure and may spiral around the periphery of the connecting tube.

In a preferred embodiment, the control device may adjust the settings of the exercise equipment via the communication device.

DESCRIPTION OF THE PREFERRED EMBODIMENTS

Figure 1:
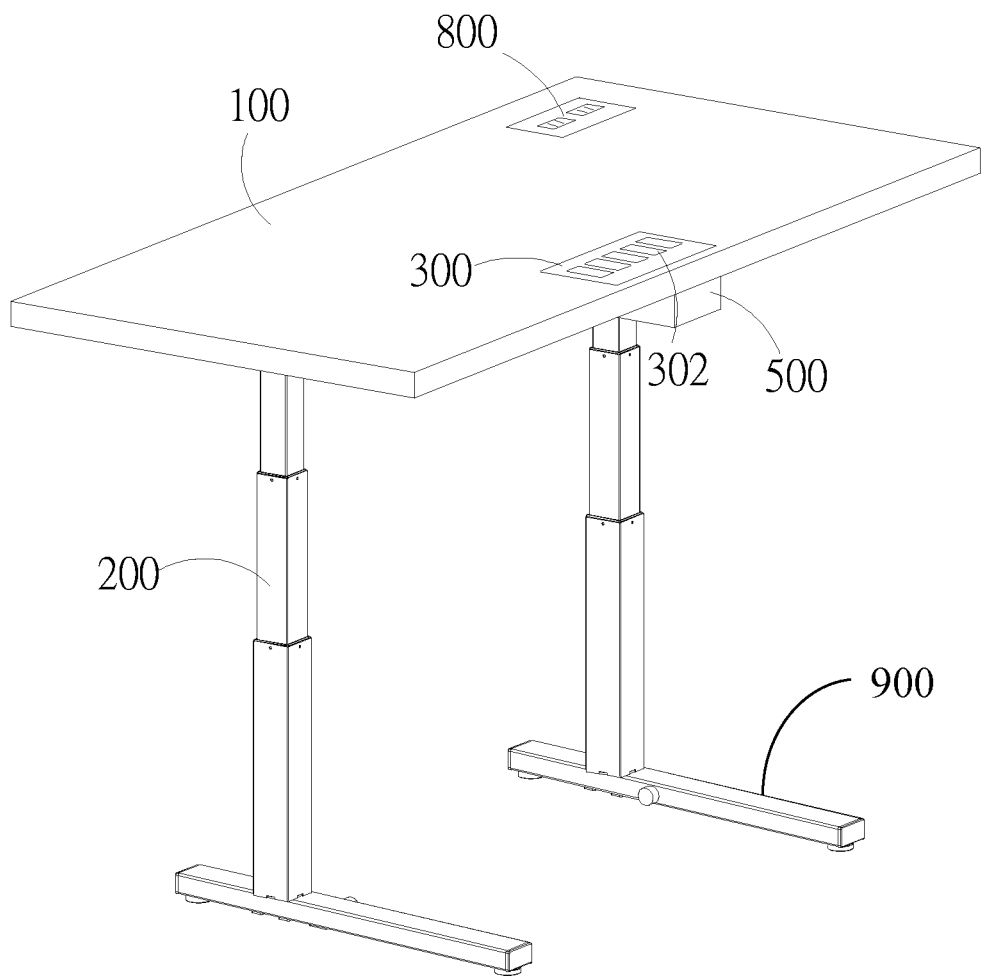
FIG. 1 is a schematic diagram showing an embodiment of the height-adjustable table with concealed wiring design of the present disclosure.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

Figure 2:
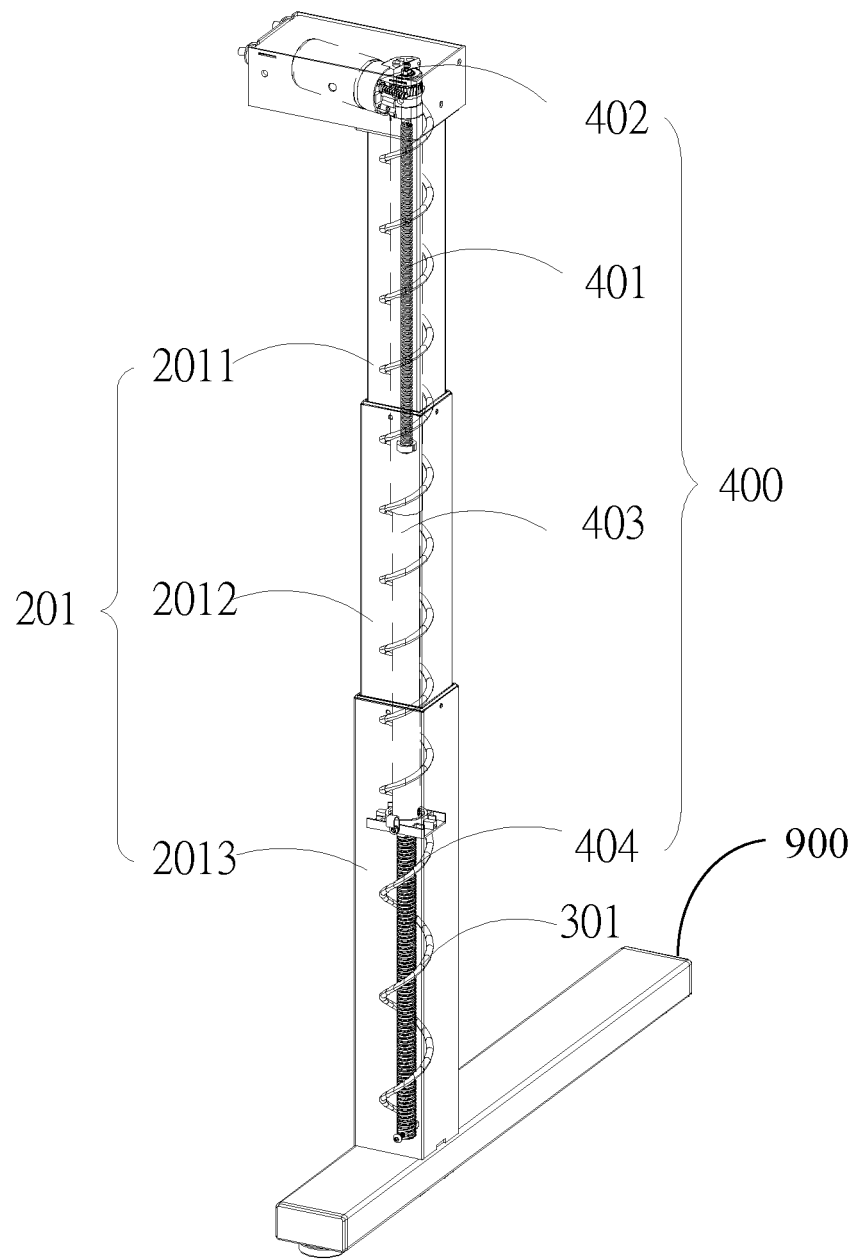
FIG. 2 is a schematic diagram showing the extended table leg of the height-adjustable table with concealed wiring design according to an embodiment the present disclosure.
Figure 3:
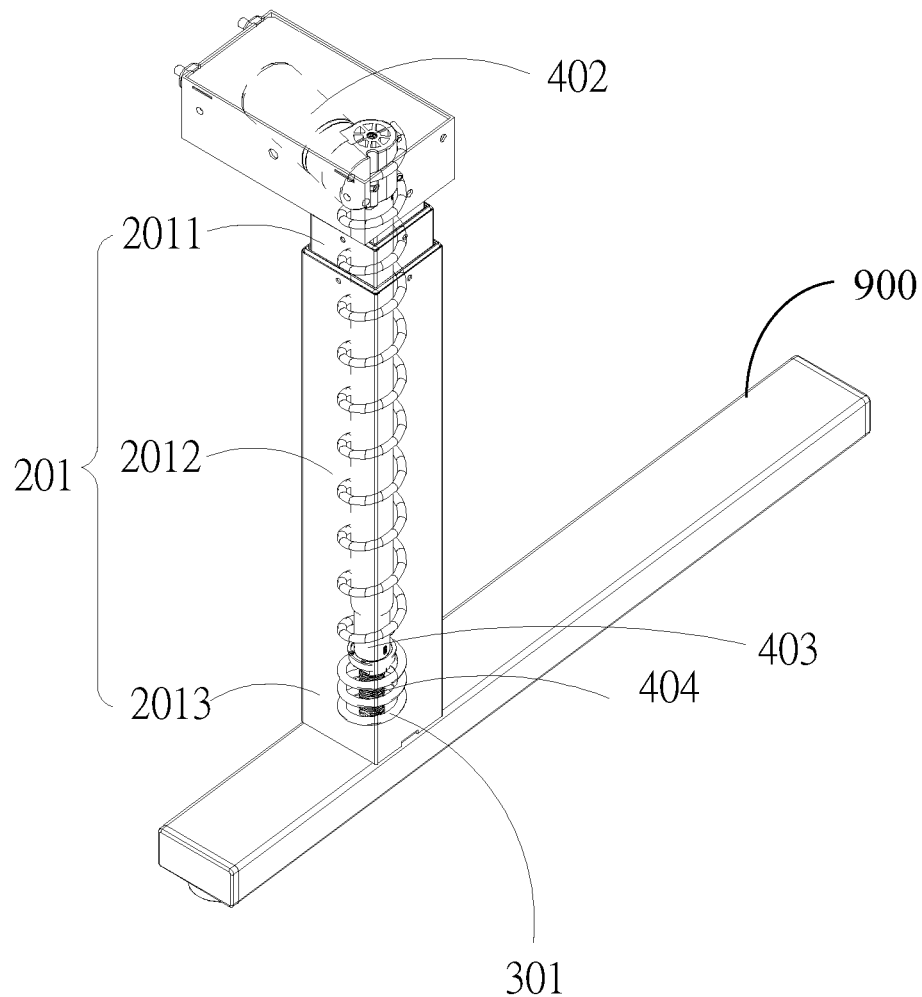
FIG. 3 is a schematic diagram showing the retracted table leg of the height-adjustable table with concealed wiring design according to an embodiment the present disclosure.

The descriptions herein refer to FIGS. 1 to 3, which are the schematic diagrams respectively showing the height-adjustable table with concealed wiring design, the extended table leg thereof, and the retracted table leg thereof, according to an embodiment of the present disclosure.

The height-adjustable table with concealed wiring design of the present disclosure may include a table surface 100, at least one table leg 200, a table foot 900, a control device 300, a driving mechanism 400, a communication device 500, and a power socket 800.

The table leg 200 of the present embodiment may be connected between the table surface 100 and the table foot 900. The means of connection between the table leg 200 and the table surface 100 may include screws, latch, etc. The means of connection is not limited to that of the present embodiment, and depending on the situation, different means of connection may be employed. The table leg 200 may include a telescoping tube structure 201, and the telescoping tube structure 201 may further include a first tube 2011, a second tube 2012, and a third tube 2013. The first tube 2011 may be accommodated in the second tube 2012, and the second tube 2012 may in turn be accommodated in the third tube 2013. One end of the third tube 2013 may be fixed to the table foot 900, such that the height of the table surface 100 from the floor is adjustable by extending or retracting the table leg 200.

Figure 4:
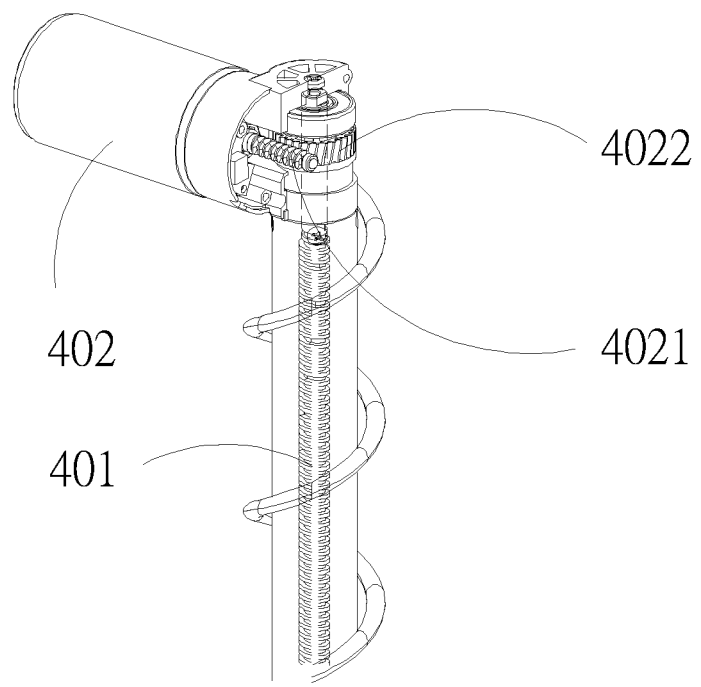
FIG. 4 is a schematic diagram showing the driving mechanism of the height-adjustable table with concealed wiring design according to an embodiment the present disclosure.

The descriptions herein refer to FIGS. 1 to 4. FIG. 4 is a schematic diagram showing the driving mechanism of the height-adjustable table with concealed wiring design according to an embodiment the present disclosure. As shown in the drawings, the telescoping tube structure 201 of the table leg 200 may be driven by the driving mechanism 400. The driving mechanism 400 may include a motor 402, a first threaded rod 401, a second threaded rod 404 and a connecting tube 403.

More precisely, the first threaded rod 401, the second threaded rod 402, and the connecting tube 403 of the driving mechanism 400 may be disposed in the telescoping tube structure 201. The motor 402 may further include a driving threaded rod 4021, and the driving threaded rod 4021 may protrude from a side of the motor. The driving threaded rod 4021 may drive the first threaded rod 401 in the connecting tube 403. The driving mechanism 400 may further include a driving gear 4022 connected to one end of the first threaded rod 401. The motor 402 may be configured to drive the driving threaded rod 4021 to rotate, and the driving threaded rod 4021 may then drive the driving gear 4022 to rotate, as shown in the drawings. As the result, the driving gear 4022 connected to the upper end of the first threaded rod 401 may actuate the rotation of the first threaded rod 401. The lower end of the first threaded rod 401 and the upper end of the second threaded rod 404 may be screwed to both ends of the connecting tube 403, respectively. The lower end of the second threaded rod 404 may be fixed to the table foot 900. Therefore, the first threaded rod 401 may be driven to be screwed into or unscrewed from the connecting tube 403. When the first threaded rod 401 is screwed into the connecting tube 403, the connecting tube 403 may be actuated to rotate. Therefore, the connecting tube 403 may be screwed into the second threaded rod 404, and the height of the height-adjustable table of the present disclosure may be further adjusted.

With the combination of first threaded rod 401, second threaded rod 404, connecting tube 403, and the motor 402, the connecting tube 403 may be screwed into or unscrewed from the first and second threaded rod 401 and 404, and one end of the connecting tube 403 may be connected to one end of the second tube 2012. Therefore, the first and second tubes 2011 and 2012 of the telescoping tube structure 201 may be extended or retracted, thereby significantly increasing the range of height adjustment of the height-adjustable table with concealed wiring design 10 of the present disclosure.

In addition, the third tube 2013 and the second threaded rod 404 of the present disclosure may be omitted depending on the situation. In this way, one end of the connecting tube 403 may be fixed to the table foot 900. When the first threaded rod 401 is driven by the motor 402 to be screwed into or unscrewed from the connecting tube 403, the first and second tubes 2011 and 2012 of the telescoping tube structure 201 may extended or collapsed, such that the height-adjustable table with concealed wiring design 10 of the present disclosure may be adjusted.

Figure 5:
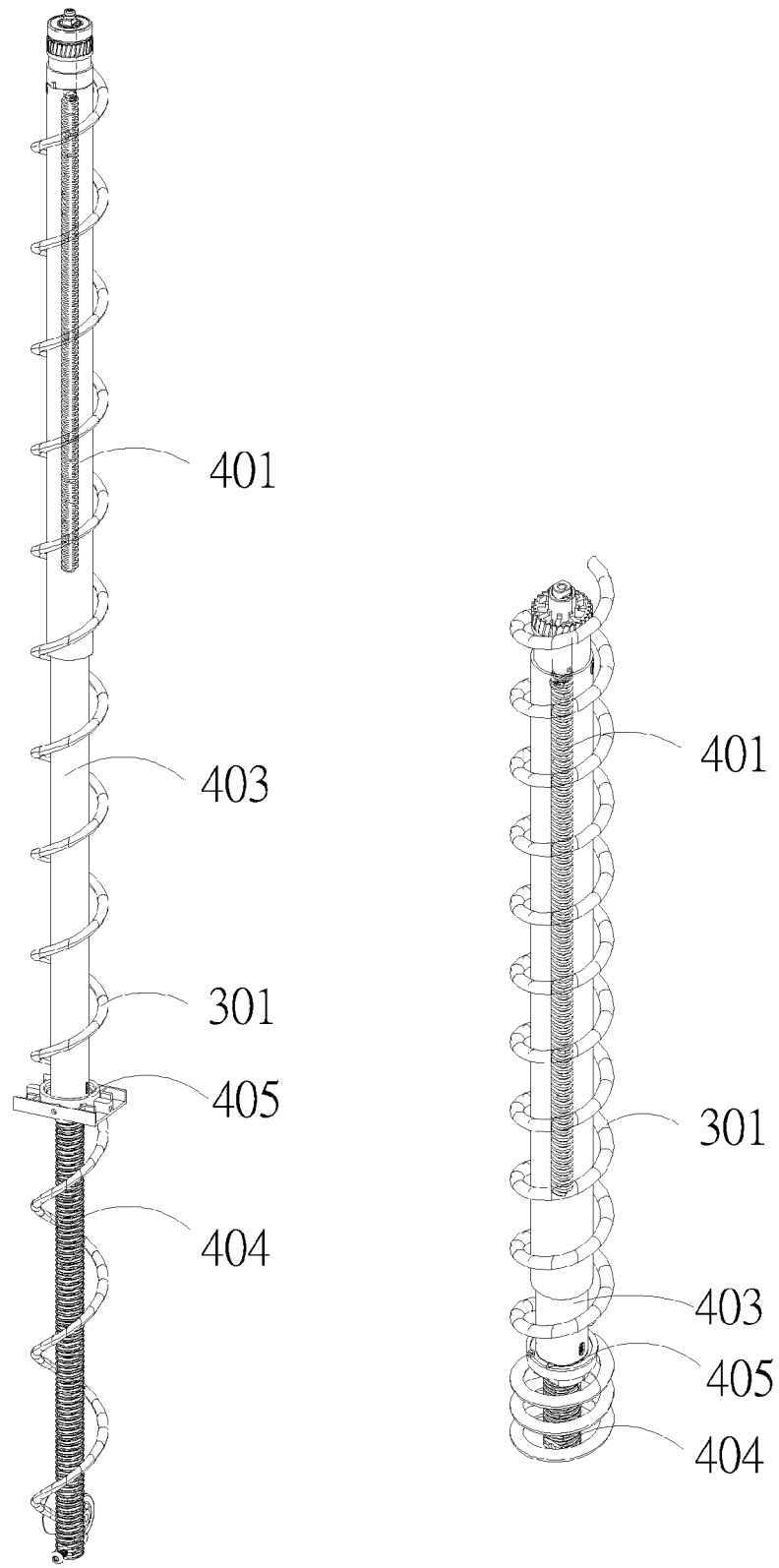
FIG. 5 is a schematic diagram showing way the wirings are wound in the height-adjustable table with concealed wiring design according to an embodiment the present disclosure.

The descriptions herein refer to FIGS. 1 to 5. FIG. 5 is a schematic diagram showing way the wirings are wound in the height-adjustable table with concealed wiring design according to an embodiment the present disclosure. As shown in the drawings, the driving mechanism 400 may be controlled by the control device 300. The control device 300 of the present disclosure may include the wiring 301 and the control interface 302 that may emit the control signal. As shown in FIG. 5, the wiring 301 may be wound around the first threaded rod 401, the second threaded rod 404 and the connecting tube 403, so as to pass through the telescoping tube structure 201. The wiring 301 may at least include the power supply cable and the signal transmission cable. However, the present disclosure is not limited thereto, depending on the requirement, other cables may be included. The signal transmission cable of the wiring 301 may be used to transmit the control signal emitted from the control interface 302, whereas the power supply cable of the wiring 301 may deliver power to drive the driving mechanism 400. Furthermore, the power supply cable of the wiring 301 may spiral around the periphery of the connecting tube 403 to form a coil-like shape around the connecting tube 403. The signal transmission cable may also spiral around the periphery of the connecting tube 403. Therefore, when the telescoping tube structure 201 is extended or collapsed, the wiring 301 may be extended or compressed around the periphery of the connecting tube 403. Besides, as shown in FIG. 5, the wiring 301 may be divided into two portions and be fixed via a fixing portion 405, such that the wiring 301 will not tangle during the rotation of the first threaded rod 401. Therefore, the first threaded rod 401 and the connecting tube 403 of the driving mechanism 400 may operate without obstruction. Furthermore, the fixing portion 405 may be connected to the telescoping tube structure 201. So, when the connecting tube 403 is screwed into or unscrewed from the second threaded rod 404, the fixing portion 405 may actuate the extension or the collapse of the telescoping tube structure 201, such that the length thereof may be adjusted. As shown in FIG. 1, the control interface 302 may be disposed under the table surface 100 and may be a control interface 302 with buttons. The way the control interface 302 is controlled may vary depending on the requirement and may not be limited to the one shown in the drawings. For instance, the control interface 302 may be controlled via buttons or touch control panel.

Furthermore, the minimum cross-section of the telescoping tube structure 201 may be, for example, a square with side length of 5.6 cm and an area of 31.36 cm$^2$. The wiring 301 of the present disclosure may spiral around the connecting tube 403 having the diameter of 3.3 cm, which is accommodated in the cross-section. Hence, the wiring 301 of the present disclosure may be subtly concealed in the table leg 200, so the user will not trip over the wiring or accidentally snap the wire, which greatly enhance the safety of the height-adjustable table.

Figure 6:
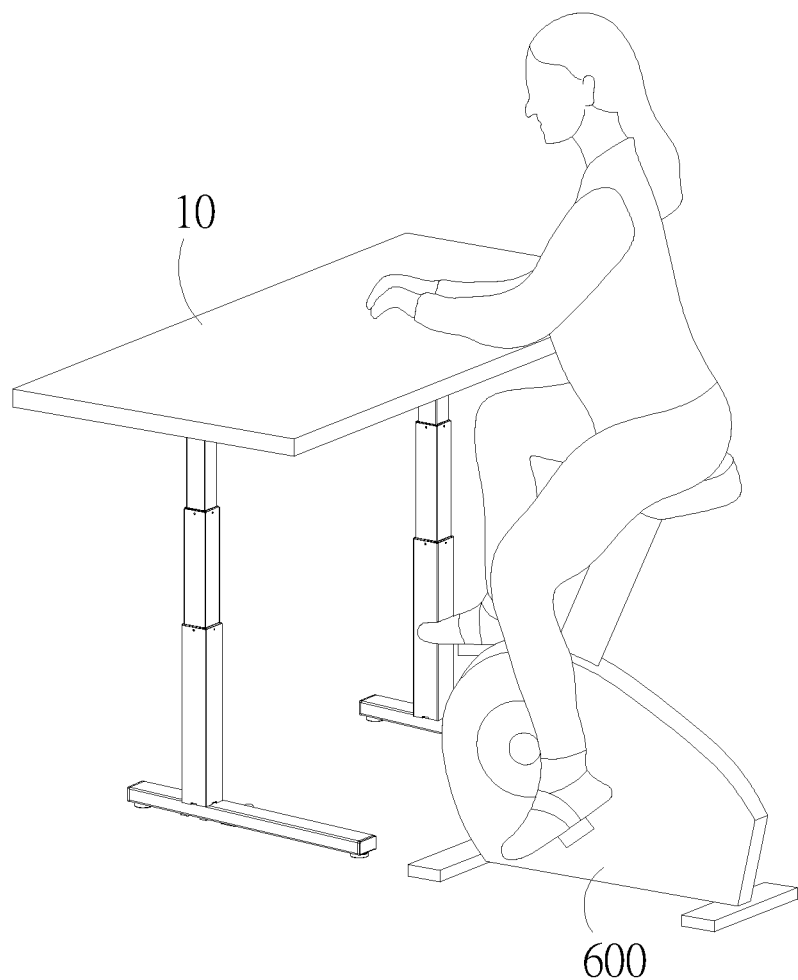
FIG. 6 is a schematic diagram showing the first exemplary usage of the height-adjustable table with concealed wiring design according to an embodiment the present disclosure.
Figure 7:
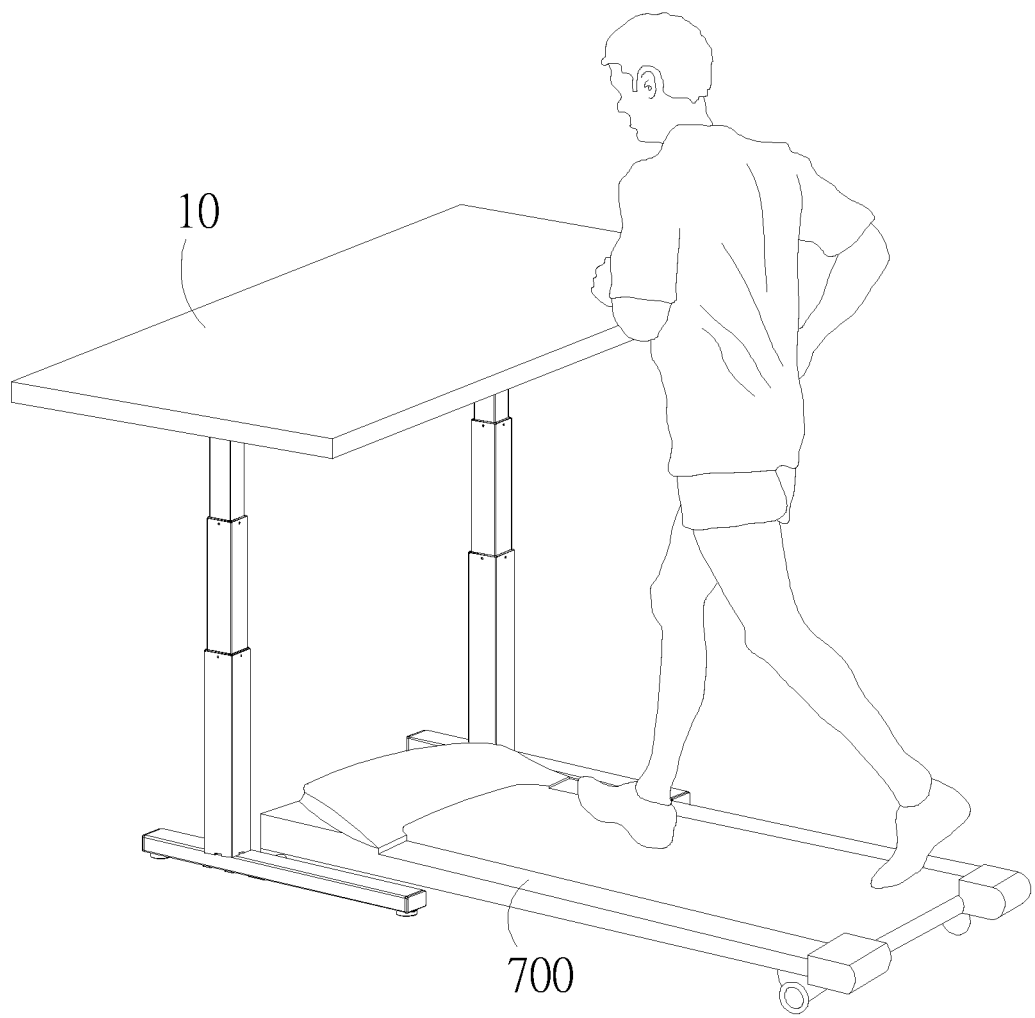
FIG. 7 is a schematic diagram showing the second exemplary usage of the height-adjustable table with concealed wiring design according to an embodiment the present disclosure.

The descriptions herein refer to FIGS. 6 and 7, which are schematic diagrams showing the first and second exemplary usages of the height-adjustable table with concealed wiring design of an embodiment the present disclosure, respectively. As shown in the drawings, the height-adjustable table with concealed wiring design 10 of the present disclosure may be used along with exercise equipment.

As shown in FIGS. 6 and 7, the height of the height-adjustable table with concealed wiring design 10 may be adjusted. Therefore, the height-adjustable table of the present disclosure may match various chairs with different heights and may be electrically coupled to the exercise equipment via the communication device 500. For instance, the height-adjustable table of the present disclosure may be used in conjunction with the exercise bicycle 600 in FIG. 6 or the treadmill 700 in FIG. 7. When the exercise equipment has a matching interface that can be electrically coupled to the height-adjustable table with concealed wiring design 10 via the communication device 500 thereof, the user may carry out his or her daily routine while cycling on the exercise bicycle 600, so that the user can workout while performing other tasks. Besides, the user may also carry out his or her daily routine while strolling on the treadmill 700 to workout. In addition, since different users have different statures, the suitable height for different users might vary. The height-adjustable table with concealed wiring design 10 of the present disclosure is capable of adjusting the height thereof to suit every user, so the user may use the table without compromising his or her posture due to the fixed heights of conventional tables.

In addition, the communication device 500 may be electrically coupled to the exercise equipment by means of wired or wireless connection. Therefore, the height-adjustable table with concealed wiring design of the present disclosure may be connected to the exercise equipment via a physical signal transmission cable or via wireless connection such as WIFI or Bluetooth. The user may choose the method of connection depending on the requirement, and the means of connection between the communication device 500 and the exercise equipment is not limited to the present embodiment. When the signals are transmitted to the exercise equipment through the physical signal transmission cable, the signal transmission cable may spiral around the periphery of the connecting tube 403 to form a coil-like shape.

In addition, a power socket 800 or charging dock (not illustrated) may be provided on the table surface 100 of the height-adjustable table with concealed wiring design 10, and the power socket 800 or charging dock may be connected to the wiring 301. The power socket 800 or charging dock may supply power to the exercise equipment to facilitate the setup of the exercise equipment. In addition, the power socket 800 or charging dock may also supply power to electrical appliances such as the computer, or the table lamp for the convenience of the user.

In conclusion, taking advantage of the combination of the driving mechanism, control device, and the wiring that is disposed in the table leg, the height of the height-adjustable table with concealed wiring design of the present disclosure may be conveniently adjusted. In addition, since the wirings are installed and concealed in the table leg, the safety and overall aesthetic of the height-adjustable table may be significantly improved.

While the present disclosure is described with some preferred embodiments, it is understood that many changes and modifications in the described embodiments can be carried out without departing from the scope and the spirit of the inventive concept that is intended to be limited only by the appended claims.

What is claimed is:

1. A height-adjustable table with concealed wiring design, comprising:
    a table surface;
    at least one table leg connected to the table surface, the table leg comprising a telescoping tube structure;
    at least one driving mechanism, the driving mechanism comprising a motor, a first threaded rod, and a connecting tube, wherein the first threaded rod and the connecting tube are disposed in the telescoping tube structure, the first threaded rod is screwed to one end of the connecting tube, and the motor is configured to drive the first threaded rod to be screwed into or unscrewed from the connecting tube to alter a length of the telescoping tube structure; and
    a control device comprising at least one wiring and a control interface, wherein the wiring is disposed in the telescoping tube structure and spirals around a periphery of the connecting tube, the wiring transmits power to the driving mechanism, the control interface transmits a control signal to the motor via a communication device to drive the at least one driving mechanism.

2. The height-adjustable table with concealed wiring design of claim 1, wherein the telescoping tube structure further comprises a first tube, a second tube, and a third tube.

3. The height-adjustable table with concealed wiring design of claim 2, wherein the first tube is accommodated in the second tube, and the second tube is accommodated in the third tube.

4. The height-adjustable table with concealed wiring design of claim 1, wherein the motor further comprises a driving threaded rod, the driving threaded rod protrudes from a side of the motor.

5. The height-adjustable table with concealed wiring design of claim 4, wherein the driving mechanism further comprises a driving gear connected to one end of the first threaded rod, the motor is configured to drive the driving threaded rod to rotate, and the driving threaded rod drives the driving gear to rotate and actuate rotation of the first threaded rod.

6. The height-adjustable table with concealed wiring design of claim 1, further comprising at least one table foot, wherein the table leg is connected between the table surface and the table foot, the driving mechanism further comprises a second threaded rod, the threaded rod is disposed in the table leg and has one end fixed to the table foot and the other end screwed to the other end of the connecting tube.

7. The height-adjustable table with concealed wiring design of claim 1, further comprising a power socket or a charging dock, the power socket or the charging dock is disposed on the table surface and is electrically coupled to the wiring.

8. The height-adjustable table with concealed wiring design of claim 1, wherein the communication device is electrically coupled to exercise equipment by means of wired or wireless connection.

9. The height-adjustable table with concealed wiring design of claim 8, wherein a signal transmission cable of the communication device is disposed in the telescoping tube structure and spirals around the periphery of the connecting tube.

10. The height-adjustable table with concealed wiring design of claim 9, wherein the control device adjusts settings of the exercise equipment via the communication device.

\* \* \* \* \*